(12) United States Patent
Hirata et al.

(10) Patent No.: US 10,678,017 B2
(45) Date of Patent: Jun. 9, 2020

(54) PROJECTION IMAGE DISPLAY DEVICE

(71) Applicant: MAXELL, LTD., Kyoto (JP)

(72) Inventors: Koji Hirata, Osaka (JP); Masahiko Yatsu, Osaka (JP); Shuji Kato, Osaka (JP); Yuki Matsumiya, Osaka (JP); Kayono Kimura, Osaka (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 15/555,019

(22) PCT Filed: Mar. 10, 2015

(86) PCT No.: PCT/JP2015/056962
§ 371 (c)(1),
(2) Date: Aug. 31, 2017

(87) PCT Pub. No.: WO2016/143061
PCT Pub. Date: Sep. 15, 2016

(65) Prior Publication Data
US 2018/0052296 A1    Feb. 22, 2018

(51) Int. Cl.
*G02B 7/02* (2006.01)
*G03B 21/14* (2006.01)
(Continued)

(52) U.S. Cl.
CPC .............. *G02B 7/021* (2013.01); *G02B 7/022* (2013.01); *G02B 17/08* (2013.01); *G03B 21/14* (2013.01);
(Continued)

(58) Field of Classification Search
CPC .... G03B 21/10; G03B 21/28; G02B 27/0025; G02B 5/08; G02B 3/0012; G02B 3/0018;
(Continued)

(56) References Cited

U.S. PATENT DOCUMENTS 8,690,345 B2    4/2014  Hirata et al.
2001/0050758 A1  12/2001  Suzuki et al.
(Continued)

FOREIGN PATENT DOCUMENTS

JP    2000-219537 A    8/2000
JP    2004-133483 A    4/2004
(Continued)

OTHER PUBLICATIONS

Search Report issued in corresponding International Patent Application No. PCT/JP2015/056962, dated Jun. 16, 2015.

*Primary Examiner* — Cara E Rakowski
*Assistant Examiner* — Christopher A Lamb, II
(74) *Attorney, Agent, or Firm* — McDermott Will & Emery LLP

(57) ABSTRACT

A projection type image display device includes an oblique projection optical system that magnifies and projects modulated image light, and includes lens elements and a reflection mirror having a convex surface. A center of an outer shape of one or more of the lens elements at a nearest position to the reflection mirror is positioned above an optical axis. The reflection mirror has a reflection surface shape orthogonal to a projection plane inclusive of the optical axis of the reflection mirror. The reflection surface shape and lens element are formed as specified. For example, the reflection surface shape is formed so that an average radius of curvature in an area through which a light flux focused at a center of the projection plane passes is smaller than that of curvature in an area through which a light flux focused at an upper end portion of the projection plane passes.

6 Claims, 7 Drawing Sheets

(51) Int. Cl.
*G03B 21/28* (2006.01)
*G02B 17/08* (2006.01)
*G03B 21/30* (2006.01)

(52) U.S. Cl.
CPC ............ *G03B 21/28* (2013.01); *G03B 21/30* (2013.01); *G03B 21/147* (2013.01)

(58) Field of Classification Search
CPC .. G02B 3/0025; G02B 3/0031; G02B 3/0075; G02B 7/02; G02B 7/021; G02B 7/022
See application file for complete search history.

(56) References Cited

U.S. PATENT DOCUMENTS

| | | | |
|---|---|---|---|
| 2006/0227299 A1 | 10/2006 | Hisada et al. | |
| 2006/0227432 A1 | 10/2006 | Yoshikawa et al. | |
| 2007/0139623 A1 | 6/2007 | Hisada et al. | |
| 2007/0285780 A1* | 12/2007 | Imafuku | G02B 5/08 359/514 |
| 2009/0009885 A1* | 1/2009 | Smith | G02B 13/18 359/708 |
| 2009/0059185 A1 | 3/2009 | Hisada et al. | |
| 2010/0097582 A1 | 4/2010 | Nagase et al. | |
| 2010/0123817 A1* | 5/2010 | Liao | B29D 11/00365 348/335 |
| 2010/0195061 A1 | 8/2010 | Takaura et al. | |
| 2011/0299049 A1 | 12/2011 | Yatsu et al. | |
| 2012/0081676 A1* | 4/2012 | Hirata | G02B 7/022 353/38 |

FOREIGN PATENT DOCUMENTS

| | | |
|---|---|---|
| JP | 2005-303206 A | 10/2005 |
| JP | 2007-164007 A | 6/2007 |
| JP | 2008-250296 A | 10/2008 |
| JP | 2009-058754 A | 3/2009 |
| JP | 2009-086315 A | 4/2009 |
| JP | 2010-072374 A | 4/2010 |
| JP | 2011-175277 A | 9/2011 |
| JP | 2011-180609 A | 9/2011 |
| JP | 2011-253024 A | 12/2011 |
| JP | 2012-053468 A | 3/2012 |
| JP | 2012-098713 A | 5/2012 |

* cited by examiner

PROJECTION IMAGE DISPLAY DEVICE

CROSS REFERENCE

This application is the U.S. National Phase under 35 U.S.C. § 371 of International Application No. PCT/JP2015/056962, filed on Mar. 10, 2015, the entire contents of which are hereby incorporated by reference.

TECHNICAL FIELD

The present invention relates to a projection type image display device using a lens or a reflection mirror which is formed by plastic injection molding.

BACKGROUND ART

Recently, widely spread has been a projection type image display device capable of projecting a good projection image with a large image while designed as use for a short distance. In a projection optical system of such a projection type image display device, it is already known to adopt a so-called oblique projection optical system that uses a lens having a complicated lens surface combined with a concave mirror having an eccentric aspherical shape in order to realize projection of a good projection image with a large image.

For example, Patent Document 1 discloses a projection optical device which has a projection lens comprising: a first optical system including a transmission type refractive element; and a second optical system with a reflection type refractive element, and in which some lenses of the first optical system are accommodated in a lower space regarding a lower end of the second optical system as a lower limit.

In addition, Patent Document 2 discloses a projection type image display device capable of projecting, by a combination of a lens system and a concave mirror, a good projection image with a large image while designed as use for a short distance.

RELATED ART DOCUMENTS

Patent Documents

Patent Document 1: Japanese Patent Application Laid-open No. 2009-86315
Patent Document 2: Japanese Patent Application Laid-open No. 2008-250296

SUMMARY OF THE INVENTION

Problems to be Solved by the Invention

In the above-described conventional technique, it is suggested that the combination of the lens system and the concave mirror in the projection optical system of the projection type image display device enables the projection of the good projection image with the large image. However, in the conventional technique, it is assumed to use, as a lens constituting the lens system, a plastic lens having a symmetrical shape with respect to an optical axis of the lens, and there is no description about problems occurring in molding the plastic lens and means for solutions thereof.

An object of the present invention is to solve problems occurring in molding a lens or a mirror having an asymmetric and complicated shape used in combination with a convex mirror, unlike the plastic lens having the symmetrical shape with respect to the optical axis of the lens, and to provide a projection type image display device having excellent characteristics at relatively low cost.

Means for Solving the Problems

In order to solve the above problems, for example, a configuration described in claim is adopted. The present application includes a plurality of means that solve the above problems, and one example of the means is a projection type image display device magnifying and projecting image light modulated by an optical modulator modulating light from a light source, and the projection type image display device comprise an oblique projection optical system magnifying and projecting the modulated image light, and is characterized in that: the oblique projection optical system comprises a plurality of lens elements, and a reflection mirror having a convex shape relative to an image projection plane; a center of an outer shape of one or a plurality of lens elements disposed at a nearest position to the reflection mirror is positioned above an optical axis shared by other lens elements; the reflection mirror has a reflection surface shape orthogonal to the image projection plane which includes the optical axis of the reflection mirror, the reflection surface shape being formed so that an average radius of curvature in an area through which a light flux focused on a center portion of the image projection plane passes is smaller than an average radius of curvature in an area through which a light flux focused on an upper end portion of the image projection plane passes; and the lens element disposed at the nearest position to the reflection mirror is formed so that an average radius of curvature of a horizontal cross-section relative to the image projection plane in a lens surface facing the reflection mirror at an upper end portion of the lens element is greater than the average radius of curvature in the area through which the light flux focused on the center portion of the image projection plane on the same lens surface passes.

Effects of the Invention

According to an embodiment of the present invention, it is possible to solve problems occurring in molding a mirror having an asymmetric and complicated shape or a lens having an asymmetric and complicated shape used in combination with the mirror, and to provide a projection type image display device having excellent projection performance at relatively low cost.

BRIEF DESCRIPTIONS OF THE DRAWINGS

FIGS. 3(A) to (E) are respectively a perspective view on a front side, a perspective view from a back side, a front view, a side view, and a back view;

FIGS. 4(A) to (E) are respectively a perspective view on a front side, a perspective view from a back side, a front view, a side view, and a back view;

FIGS. 5(A) to (C) are respectively a front view, a side view, and a back view;

Figure 8:
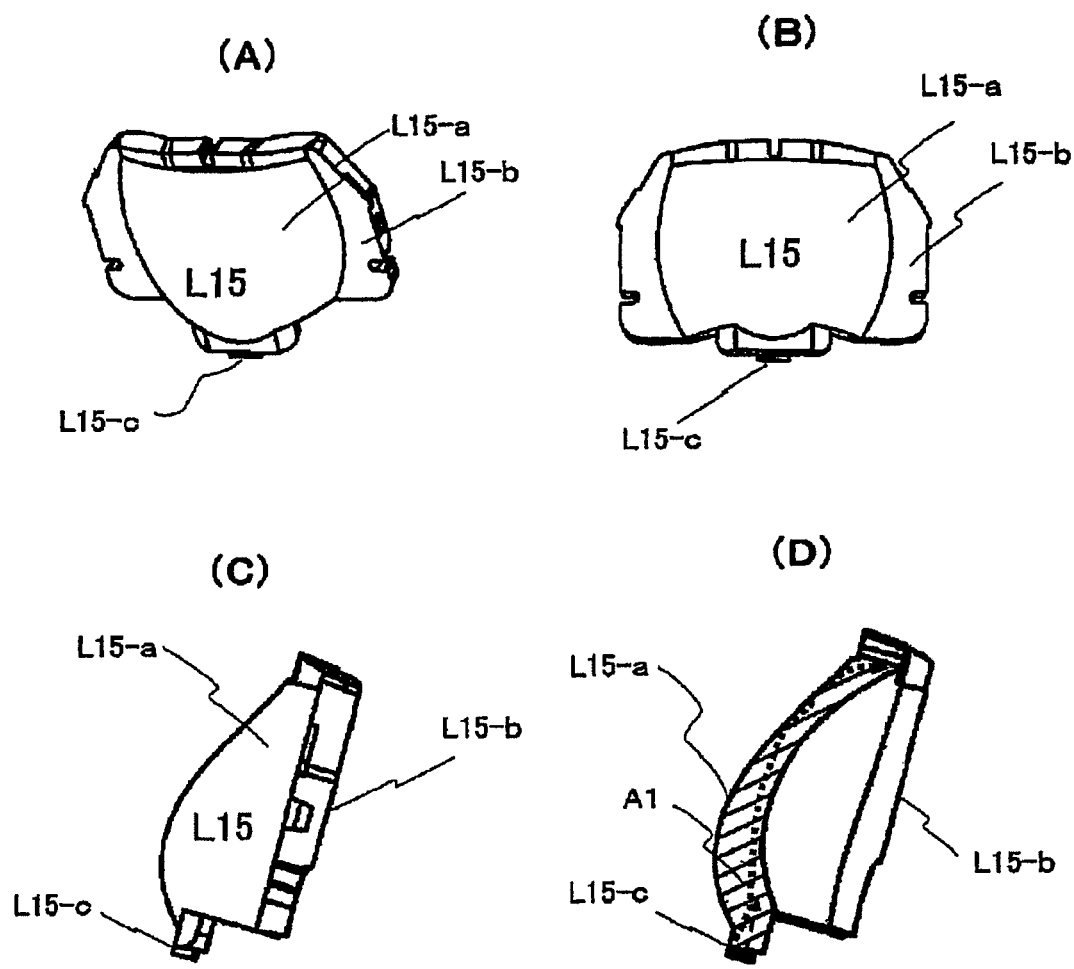
Figure 9:
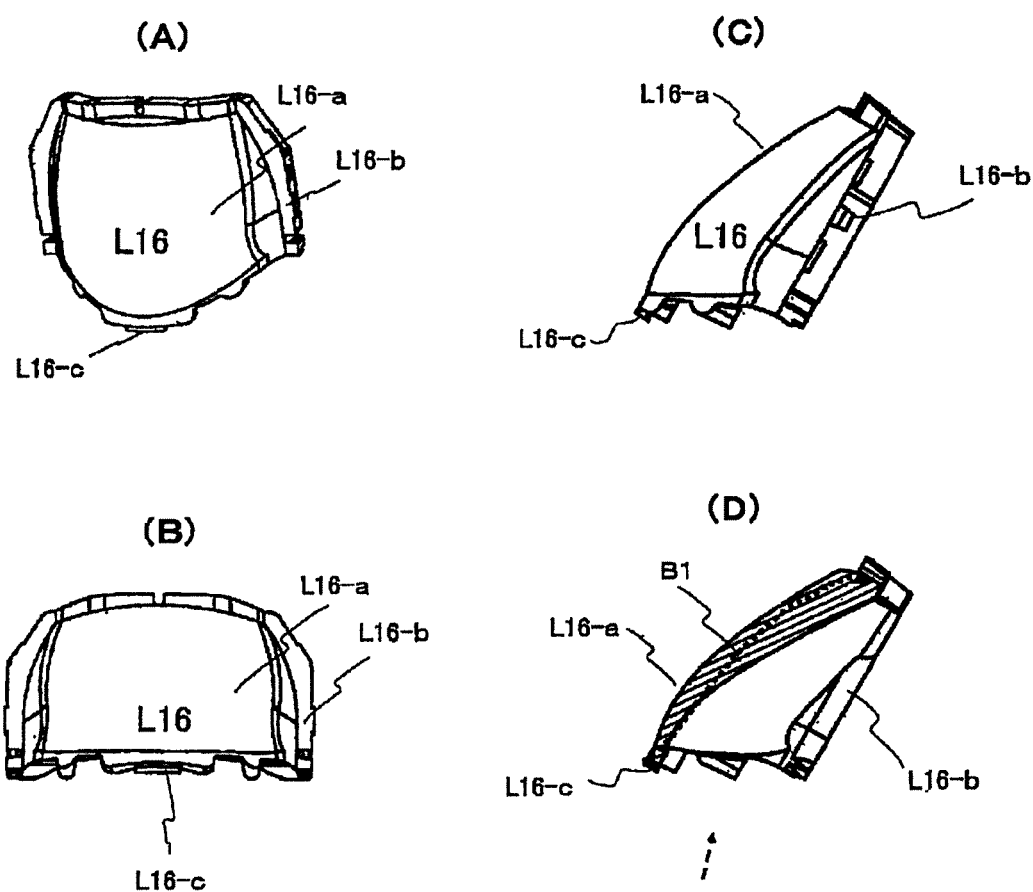

FIG. 8 is a view illustrating a shape of a conventional first free-form surface lens for comparison with the embodiment, and FIGS. 8(A) to (D) are respectively a perspective view, a plan view, a side view, and a side sectional view; and FIG. 9 is a view illustrating a shape of a conventional second free-form surface lens for comparison with the embodiment, and FIGS. 9(A) to (D) are respectively a perspective view, a plan view, a side view, and a side sectional view.

DETAILED DESCRIPTION OF PREFERRED EMBODIMENTS

Hereinafter, embodiments of the present invention will be described with reference to the drawings. In the following description, a free-form surface lens and a free-form surface mirror will be described as an example of a lens and a mirror having an asymmetric and complicated shape.

Figure 1:
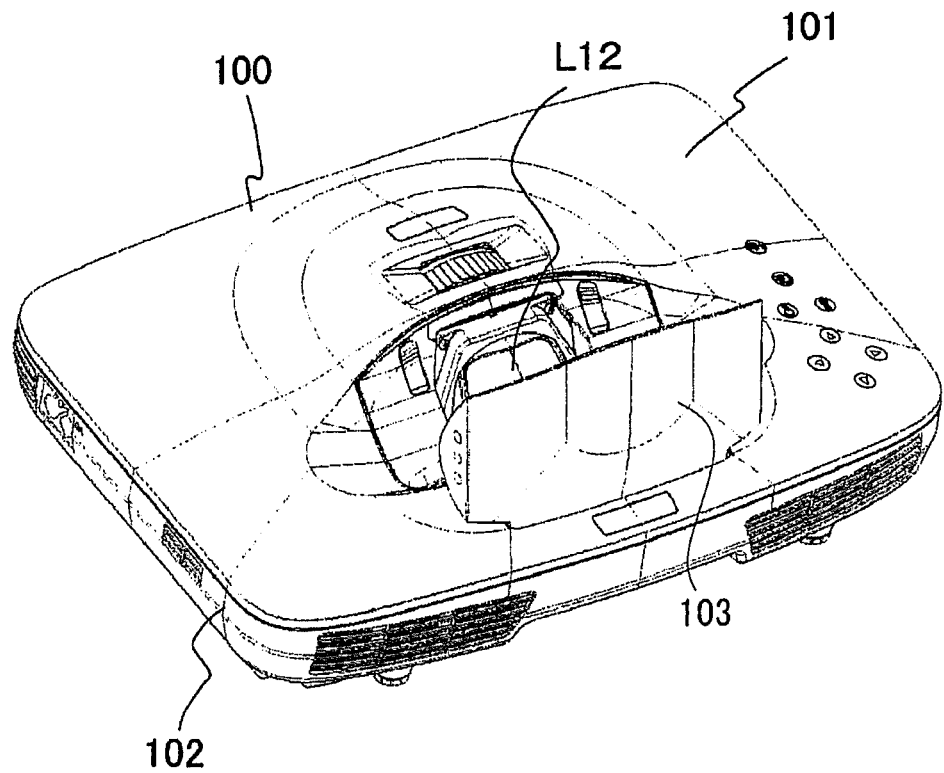
FIG. 1 is a perspective view illustrating an overall appearance of a projection type image display device according to an embodiment of the present invention.

First, FIG. 1 is a perspective view illustrating an overall appearance of a projection type image display device according to an embodiment of the present invention, in which a free-form surface lens according to an embodiment is used in combination with a concave mirror. In FIG. 1, "100" represents a projection type image display device, "101" represents a top cover of the projection type image display device 100, and "102" represents a bottom cover. As is apparent from FIG. 1, a window part 103 that is opened at a time of using the projection type image display device 100 is openably attached to a portion of the top cover 101. Incidentally, in FIG. 1, a state in which the window part 103 is opened is illustrated, and a free-form surface lens constituting a projection optical system described below is indicated by "L12".

Although not illustrated in FIG. 1, components for configuring the projection type image display device 100 are mounted in an internal space formed by the top cover 101 and the bottom cover 102. For example, the constituent components are: a lamp serving as a light source; an optical modulator; an oblique projection optical system including a free-form surface lens or a free-form surface mirror; various circuit components including a power supply circuit or a control circuit; a cooling fan; and the like.

The optical modulator is an optical modulator, by which light from a light source is modulated into image light based on an external image signal or the like, and is an image display element such as a Digital Light Processing (DLP) and a liquid crystal panel. The oblique projection optical system includes a so-called free-form surface lens or free-form surface mirror that can project the image light by reducing its trapezoidal distortion etc. even from an extremely short distance (large inclination angle) with respect to a wall surface, and thereby can obtain an excellent projection image. The various circuit components include a power supply circuit or a control circuit that supplies necessary power or control signals to the constituent components. The cooling fan guides heat generated by the constituent components outside the device.

Figure 2:
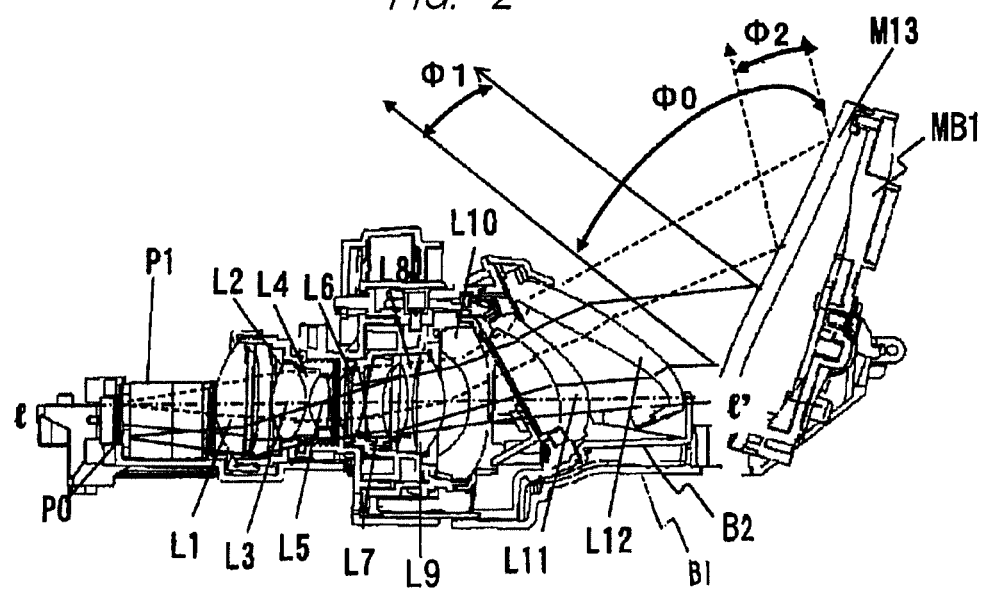
FIG. 2 is a lens arrangement diagram for describing an operation principle of a projection lens in an oblique projection optical system according to an embodiment.

Next, FIG. 2 is a lens arrangement diagram for describing the operation principle of the projection lens in the oblique projection optical system. The oblique projection optical system of FIG. 2 includes a total of twelve lenses indicated by L1 to L12 and one mirror indicated by M13. Here, a reflection surface of the mirror M13 and lens surfaces of the lenses L11 and L12 form free-form surface shapes, respectively. The lenses L11 and L12 are so-called free-form surface lenses. Therefore, even the oblique projection optical system that projects an image at an extremely large inclination angle can obtain a projection image whose trapezoidal distortion is reduced. That is, according to this, a degree of freedom of design is about five times larger than that of the aspherical surface, and satisfactory aberration correction can be performed.

In addition, in FIG. 2, a light source is disposed on an opposite surface of a prism optical element indicated by P0. The light source is a semiconductor light source in this example. Light from the light source is totally reflected by its prism surface, is incident on an image display element indicated by P1, is converted into an image light flux by the image display element P1, passes through the prism surface, and is incident on the projection lens. The image display element P1 is a reflection type image display element.

The image light flux from the image display element P1 (the overall image light flux is indicated by ϕ0) passes through different positions of the respective lenses in the projection lens with respect to an image forming position of a projection plane. The free-form surface mirror M13 and the free-form surface lenses L11 and L12 are positioned above the optical axis shared by most of the other lenses, and as is apparent from FIG. 2, these free-form surface lenses L11 and L12 form such a shape that an average radius of curvature in a horizontal cross-section relative to an image projection plane in the lens surface facing the mirror M13 at an upper end portion thereof is larger than an average radius of curvature in an area through which the light flux focused at a center portion of the image projection plane on the same lens surface passes. In addition, the mirror M13 has a reflection surface shape formed orthogonal to the image projection plane which includes its optical axis, the reflection surface shape being formed so that an average radius of curvature in an area through which the light flux focused at the center portion of the image projection plane passes is smaller than an average radius of curvature in an area through which the light flux focused at an upper end portion of the image projection plane passes. Therefore, by eliminating unnecessary lens effective areas, miniaturization can be achieved. This makes it possible to reduce the cost of the whole device.

In addition, the lens surface of the lens indicated by L10 in FIG. 2 is made into an aspherical lens, and so coma aberration and spherical aberration thereof are corrected. That is, the lens L10 is an aspherical lens. Furthermore, since the lens L10 is disposed at a position through which the light flux passes unevenly so as to correct high-order coma aberration occurring when the light flux is obliquely incident on the lens is corrected by making the lens surface thereof aspherical.

Following the lens L10 that is the aspherical lens, free-form surface plastic lenses, which are indicated by L11 and L12 and are the free-form surface lenses, and a free-form surface plastic lens, which is indicated by M13 and is the free-form surface mirror, are attached as a part of the projection lens forming the oblique projection optical system.

Here, for convenience of description, FIG. 2 illustrates which portion in each of the lenses indicated by L1 to L12 constituting the projection lens is passed through by the light flux φ2 focused at the upper end segment of the projection plane and the light flux φ1 focused at a substantial center segment of the projection plane. Since the upper-limit light of the light flux φ2 focused at the upper end segment of the projection plane and the lower-limit light of the light flux φ1 focused at a substantial center segment of the projection plane do not overlap each other at the aspherical lens L10 and the free-form surface lenses L11 and L12, aberration correction becomes possible alone, and correction capability is greatly improved.

This tendency becomes more conspicuous in the free-form surface mirror M13. L1 to L10, which are the lenses contributing to aberration correction in an area relatively near to the optical axis, are incorporated in a lens barrel B1, and L11 and L12, which are lenses contributing to aberration correction in an area apart from the optical axis, are incorporated in a lens barrel B2 separate from the lens barrel B1 in order to adjust their focuses. By this, a distance between the lens L10 and the lens L11 and a distance between the lens L12 and the free-form surface mirror M13 can be adjusted, and a distance between the lenses L11 and L12 can also be adjusted at the same time.

On the other hand, the free-form surface mirror M13 is attached to a mirror base MB1, and has a structure that can be opened and closed by, for example, an electric motor (not illustrated). Further, since all of these are fixed to a projection lens base with high accuracy, predetermined focus performance can be obtained.

Figure 3:
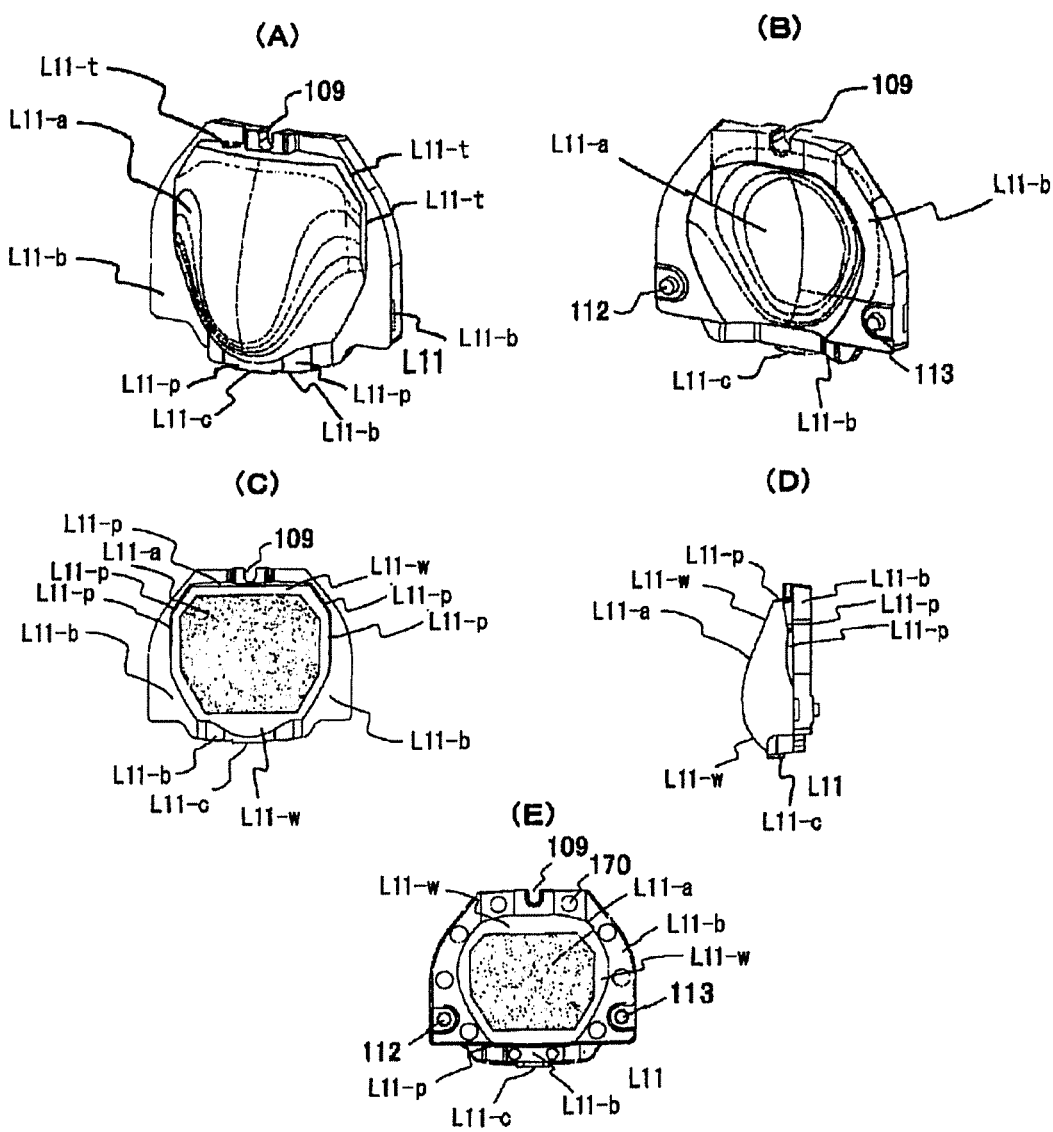
FIG. 3 is a view illustrating an outer shape of a free-form surface lens (L11) according to an embodiment.

FIG. 3 illustrates an outer shape of the free-form surface lens L11 described above. FIG. 3(A) is a perspective view when viewed from a front side of the free-form surface lens L11, FIG. 3(B) is a perspective view when viewed from a back side, FIG. 3(C) is a front view, FIG. 3(D) is a side view, and FIG. 3(E) is a back view. The free-form surface lens L11 is a plastic lens, and as is apparent from FIG. 3, a so-called lens end face part (also referred to as an end face part) L11-b is provided together with a lens effective area L11-a. The lens end face part L11-b is provided in an outer peripheral portion of the lens effective area L11-a for the purpose of positioning and holding the lens when the lens is incorporated in the lens barrel B2. L11-b particularly points a surface of the end face part.

In particular, in FIGS. 3(A) and (B), contour lines for indicating the surface shape of the free-form surface lens L11 are shown by broken lines in the lens effective area L11-a of the free-form surface lens L11. In addition, "L11-c" in FIG. 3 indicates a gate part for injecting a resin.

Figure 4:
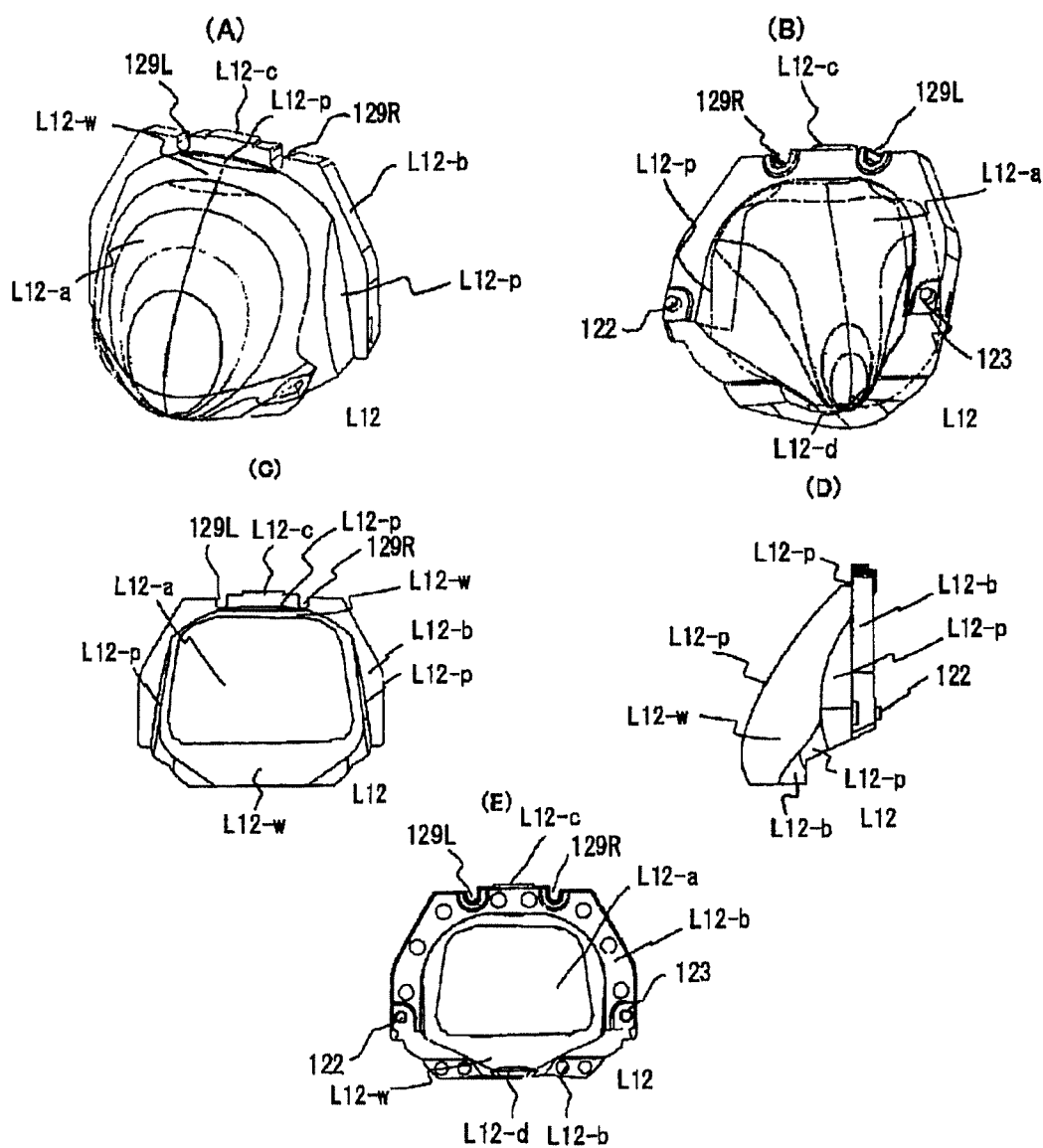
FIG. 4 is a view illustrating an outer shape of a free-form surface lens (L12) according to an embodiment.

FIG. 4 illustrates an outer shape of the free-form surface lens L12 described above in the same manner as in FIG. 3. FIG. 4(A) is a perspective view when viewed from a front side of the free-form surface lens L12, FIG. 4(B) is a perspective view when viewed from a back side, FIG. 4(C) is a front view, FIG. 4(D) is a side view, and FIG. 4(E) is a back view. Similarly to above L13, the free-form surface lens L12 is also a plastic lens, and as is apparent from FIG. 4, a so-called lens end face part L12-b is provided together with a lens effective area L12-a. The lens end face part L12-b is provided in an outer peripheral portion of the lens effective area L12-a for the purpose of positioning and holding the lens when the lens is incorporated in the lens barrel B2.

In particular, in FIGS. 4(A) and (B), contour lines for indicating the surface shape of the free-form surface lens L12 are indicated by broken lines in the lens effective area L12-a of the free-form surface lens L12. In addition, "L12-c" in FIG. 4 indicates a gate part for injecting a resin.

Figure 5:
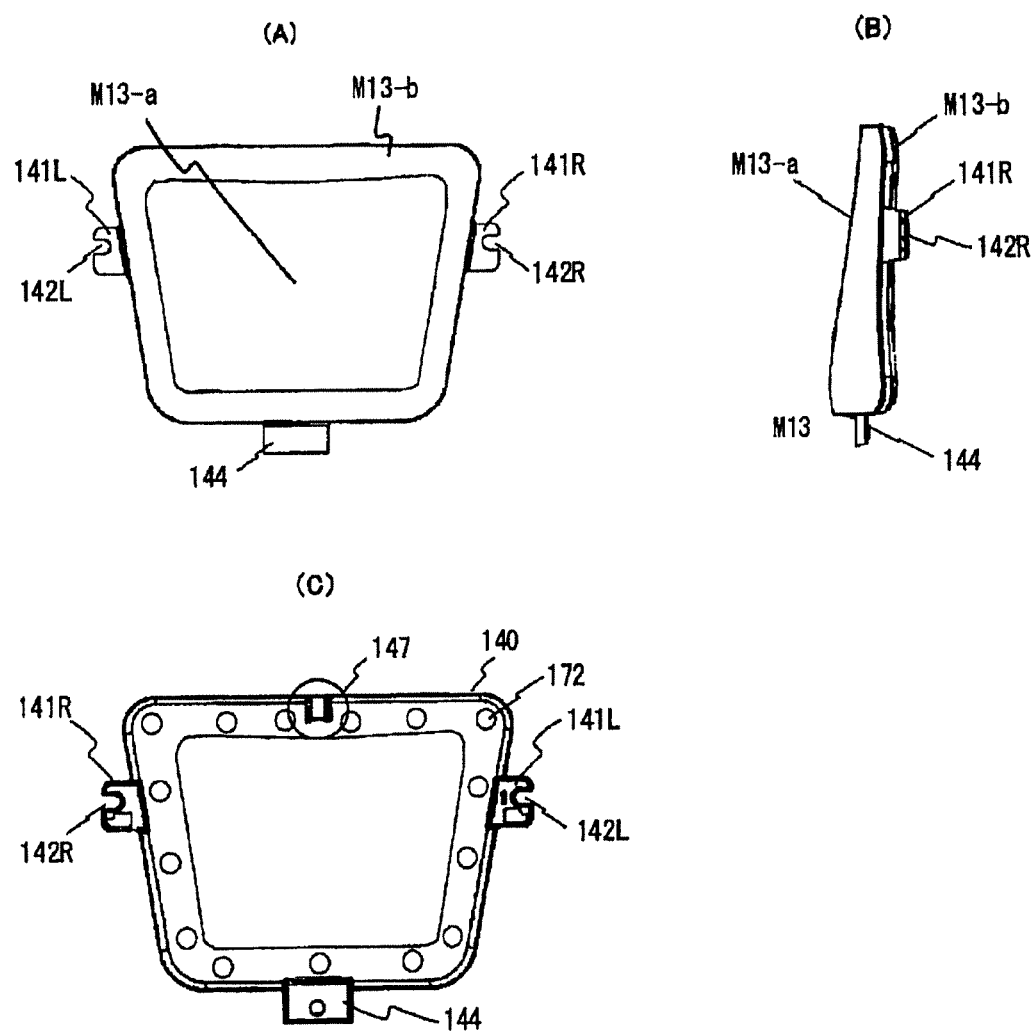
FIG. 5 is a view illustrating an outer shape of a free-form surface mirror (M13) according to an embodiment.

Furthermore, FIG. 5 illustrates an outer shape of the free-form surface mirror M13 described above. FIG. 5(A) is a front view of the free-form surface mirror M13, FIG. 5(B) is a side view, and FIG. 5(C) is a back view. The free-form surface mirror M13 is made of plastic in the same manner as described above. As is apparent from FIG. 5, the free-form surface mirror M13 includes a free-form surface area, which is a lens area obtained by making the free-form surface shape extend as it is, in an outer peripheral portion of the lens effective area M13-a together with the lens effective area M13-a.

The reflection mirror surface may be designed so that it is a convex surface relative to the image projection plane and has a uniform mirror thickness in order to improve moldability of the mirror and obtain mass production stability. Specifically, according to a designing method of the present embodiment, the mirror having a uniform thickness can be obtained by making aback surface shape of the mirror surface as a reflection surface substantially the same shape as the reflection surface. On the other hand, from the viewpoint of ease in being processed, the back surface shape, whose average curvature matches with the reflection surface, may be a curved surface or a substantially flat surface.

Meanwhile, surface roughness of the back surface may be set to be less than 20 times of surface roughness of the lens effective area. As a result, the back surface at a time of mirror molding (a mold surface is a convex surface) tightly adheres to a mold, and a balance of sticking between the reflection surface and the back surface (in other words, sticking of a molded article to the mold surface) at a time of releasing the mirror from the mold is improved. Therefore, the free-form surface shape accuracy of the mirror surface is improved consequently. In order to improve the balance of sticking described above, a further improvement effect can be obtained when the surface roughness of the back surface is less than 10 times of the surface roughness of the lens effective area, and a free-form surface mirror having excellent shape accuracy in a free-form surface effective area is provided.

Furthermore, so-called fixing parts 141 and 144 are provided at portions in an area other than the free-form surface area of the free-form surface mirror for the purpose of positioning and holding the mirror when attached to the mirror base MB1. The fixing part 141 is indicated by 141L and 141R.

The free-form surface lenses L11 and L12 and the free-form surface mirror M13 described above are prepared as follows as a designing method including the molding method thereof. That is, in the designing method, a mold for injection molding is produced, and while shrinkage and warpage, etc. of plastic are considered, the correction of a shape of the mold is repeated more than once so that an error about the shape of the molded lens surface is minimized with respect to the designed shape. By using the mold having the shape obtained by such correction, the lens or the mirror is formed by injection molding.

In general, in the injection molding, a transparent resin having a pellet or powder form is thermally melted in a screw, and the thermally melted resin in a space formed by movable and fixed pieces from gate parts (L11-c, L12-c, M13-c) is extruded through a spool and a runner of the mold while being pressurized by rotation of the screw, and is filled in the mold.

Incidentally, here, the knowledge found by the present inventors when the above free-form surface lenses L11 and L12 have been produced by using the mold for injection molding will be described below.

As described above, on an incident surface on which an effective light flux contributing to image formation is incident and an emission surface from which the light flux emits after lens action at a time of optical design, aberration correction for the free-form surface lens is performed as a degree of freedom of design with respect to the lens shape in the effective area through which the effective light flux passes.

On the other hand, in order to hold and fix the free-form surface lens in the lens barrel with high accuracy, the lens end face, that is, a face for fixing the lens to the lens barrel is set together with the lens effective area described above, and these are joined together to determine a final shape of the lens.

However, in the free-form surface lens having a complicated shape, a shape of the lens surface is often asymmetric with respect to the optical axis. Thus, it becomes difficult to provide the end face over the entire lens surface.

Incidentally, in a case where it is difficult to provide the above-described end face over the entire lens surface, in particular, the lens is molded in the mold, and then the lens is released from the mold. Therefore, mold release resistance generated by the mold release is not uniform in the lens surface, and this has become a reason for deformation of the lens.

Thereat, in order to solve the above-mentioned problems, means for the solution by the present inventors will be described below.

First, a method for designing a heretofore existing free-form surface lens according to the conventional technique will be described below with reference to FIGS. 8 and 9. FIG. 8 illustrates a shape of a conventional first free-form surface lens for comparison with the present embodiment. FIG. 9 illustrates a shape of a conventional second free-form surface lens for comparison with the present embodiment.

First, as a more specific example, a free-form surface lens L15 illustrated in FIGS. 8(A) to (D) is a lens corresponding to the free-form surface lens L11 illustrated in FIG. 3. FIG. 8(A) is a perspective view of L15, FIG. 8(B) is a plan view, FIG. 8(C) is a side view, and FIG. 8(D) is a side sectional view. In addition, a free-form surface lens L16 illustrated in FIGS. 9(A) to (D) is a lens corresponding to the free-form surface lens L12 illustrated in FIG. 4. FIG. 9(A) is a perspective view of L16, FIG. 9(B) is a plan view, FIG. 9(C) is a side view, and FIG. 9(D) is a side sectional view.

As is apparent from FIG. 8, a lens end face part L15-*b* for positioning and holding the lens at a time of installation is provided in an outer peripheral portion of a lens effective area L15-*a*. Similarly, a lens end face part 16-*b* for positioning and holding the lens at the time of installation is provided in an outer peripheral portion of a lens effective area L16-*a*.

However, in the free-form surface lenses due to their the complicated lens shapes, arise portions in which the end face parts L15-*b* and L16-*b* are not provided in parts thereof, that is, lower end segments of the lens effective areas L15-*a* and L16-*a* in FIGS. 8(A) to (D) and FIGS. 9(A) to (D).

In such a portion in which the end face part is not provided, when the lens is molded in the mold and then is released from the mold, mold release resistance caused by the mold release is not uniform in the lens surface, and this becomes a reason for deformation of the lens.

In the designing method of the present embodiment, as described above, when the shape of the lens surface is a concave surface shape and it is impossible to provide the end face over the entire periphery of the lens surface, the end face L11-*b* is continuously formed at the outer peripheral portion of the lens effective area by connecting the lens effective area and the end face by an end face and a curved surface (straight line and curved line) to such an extent that an inclination direction of the surface of the lens effective area (that is, a sign of a differential value) is not changed.

In addition, it has been found effective to provide a taper for pulling out the lens from the mold in the part. At this time, in particular, when the longest distance of these flat surfaces and curved surfaces (straight lines and curved lines at the end portions thereof) becomes ½0 or more of a long side of the lens, it has been found effective to provide a tapered surface having an angle of 5 degrees or more to 20 degrees or less to an end surface thereof. Incidentally, when the taper angle exceeds 20 degrees, it is difficult to continuously form the lens effective area and the end face part.

Figure 6:
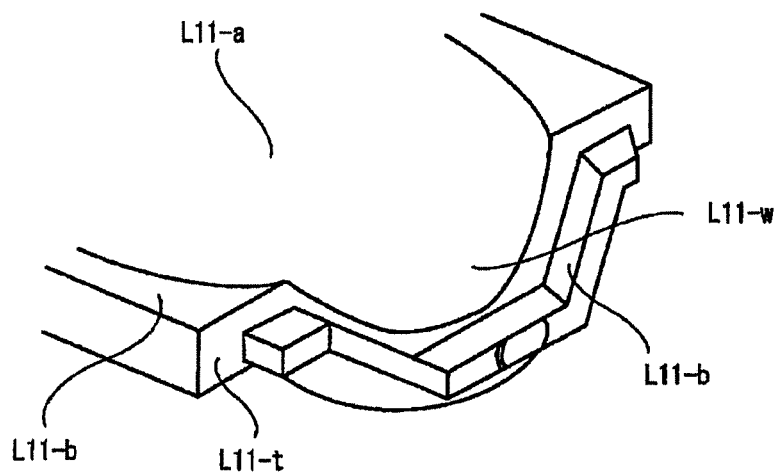
FIG. 6 is an explanatory diagram for describing a configuration and a designing method of the free-form surface lens (L11) according to an embodiment.

For example, in the above-described free-form surface lens L11, as illustrated in FIG. 3 and further FIG. 6, the curved surfaces L11-*w* and the flat surfaces L11-*p* described above are formed in the outer peripheral portion of the lens effective area L11-*a* (indicated by a mesh area in FIG. 3(C) or (E)), and thereby the end faces L11-*b* are connected. In addition, a reference numeral "109" in FIG. 3 denotes a concave portion formed in the end face part L11-*b* and positioning and holding the lens at the incorporating time thereof, and "112" and "113" indicate protrusions for positioning and holding the lens.

In addition, as is apparent from FIG. 3(C) or FIG. 6, the end faces L11-*b* on both sides of the lens effective area L11-*a* are connected at a lower portion of the lens by forming the curved surfaces L11-*w* and the flat surfaces L11-*p* described above. Incidentally, it is as described above to set the curved surface L11-*w* so that the inclination direction of the lens effective area 11-*a* in the vicinity thereof (that is, a sign of a differential value) is not changed. In this case, since the lens effective area 11-*a* in the vicinity thereof is a concave surface, the curved surface L11-*w* is set as a curved line protruding downward. The flat surfaces L11-*p* at the end portions of those formed curved surfaces L11-*w* are the above-described tapered surfaces.

According to the designing method of the free-form surface lens of the present embodiment as described above, the end portion of the lens effective area L11-*a* is continuously formed between the end faces L11-*b* on both sides thereof. As a result, the connection between the end faces L11-*b* is strengthened, and the mold release resistance caused by the mold release also becomes uniform in the lens surface, so that the completed free-form surface lens can be stably taken out from the mold without deformation of the lens.

FIG. 6 is an explanatory diagram for describing the designing method of the above free-form surface lens L11, and is an enlarged view illustrating an aspect of the lens effective area L11-*a* and the end face L11-*b* of the free-form surface lens L11 of FIG. 3.

Figure 7:
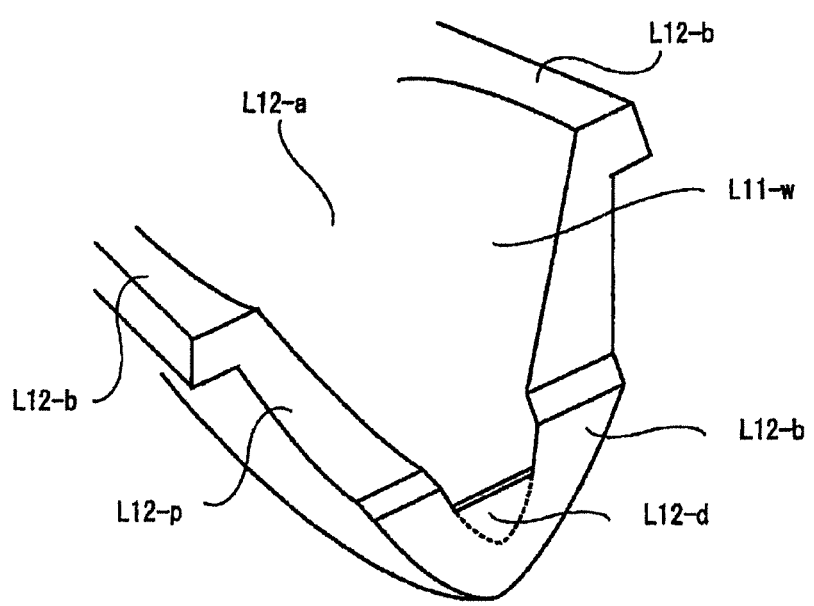
FIG. 7 is an explanatory diagram for describing a configuration and a designing method of the free-form surface lens (L12) according to an embodiment.

In addition, for example, in a portion in which the end face part L12-*b* of a part (a lower-side portion in the drawing) of the above-described free-form surface lens L12 as illustrated in FIG. 4 and further FIG. 7 is not provided, the curved surfaces L12-*w* and the flat surfaces L12-*p* are formed between the end faces L12-*b* and L12-*b* on the both sides of the lens effective area and in the outer peripheral portion of the lens effective area L12-*a*, so that the end faces L11-*b* are connected to each other.

In addition, the end face parts L12-*b* on the both sides of the lens effective area L12-*a* are connected at the lower portion of the lens by forming the curved surfaces L12-*w* and the flat surfaces L12-*p* described above. Incidentally, it is as described above to set the curved surface L12-*w* so that the inclination direction of the lens effective area 12-*a* in the vicinity thereof (that is, a sign of a differential value) is not changed. The flat surfaces L12-*p* of the end portions of those formed curved surfaces L12-*w* are the above-described tapered surfaces.

Incidentally, in this case, a dam-shaped convex portion L12-*d* is further formed between the curved end face parts L12-*b*, and the side surface thereof is set to be a tapered surface as in the above case. In addition, also here, "129L" and "129R" in FIG. 4 each indicate a concave portion formed in the end face part L12-*b* and positioning and holding the lens at the incorporating time, and "122" and "123" similarly indicate protrusions for positioning and holding the lens.

According to the shape of the free-form surface lens of the present embodiment as described above, the connection between the end faces L12-*b*, which includes the action by the above dam-shaped protrusion L12-*d*, is further strengthened, and the mold release resistance caused by the mold release also becomes uniform in the surface of the lens. Therefore, deformation of the lens is not caused, and more specifically, it is possible to safely take out the completed free-form surface lens from the mold so that the lens L12 having an "U"-shaped cross-section does not spread on both sides.

FIG. 7 is an explanatory diagram for describing the designing method of the above free-form surface lens L12 and is an enlarged view illustrating an aspect about the lens effective area L12-*a* and the end faces L12-*b* of the free-form surface lens L12 of FIG. 4.

Next, in particular in molding the lens surface, there is a problem in which the above-described free-form surface lenses L11 and L12 stick on the mold inclusive of the lens effective areas L11-*a* and L12-*a*, the end faces L11-*b* and L12-*b* thereof, and the tapered surface by the shrinkage of the lens due to a temperature difference between the lens forming resin and the mold. This is one of the reasons why the lens is deformed in taking out the completed free-form surface lens from the mold. In particular, since a front surface of the lens surface is mirror-finished, an adverse influences due to such a phenomenon are significant.

Therefore, as a result of studying the above-mentioned problem, it has been found effective as a countermeasure to reduce the above sticking on the mold by making the surface roughness coarser in the free-form surface lenses L11 and L12, in particular, in the end faces L11-*b* and L12-*b* thereof. Incidentally, a preferable surface roughness may be, for example, about 20 nm, or 20 nm or more to 100 nm or less.

In addition, the phenomenon as described above is not limited to the free-form surface lenses L11 and L12, and has been also observed also in the free-form surface mirror M13 as a plastic mirror molded by a synthetic resin.

For this, it has been proposed to apply the above-described lens designing method to the free-form surface mirror M13 as a plastic mirror. More particularly, in the free-form surface mirror and its designing method according to the present embodiment, the free-form surface mirror M13 illustrated in FIGS. 5(A) to (C) includes, in an outer peripheral portion of the lens effective area M13-*a* as a reflection surface thereof, a free-form surface area as a lens area in which the free-form surface shape extends as it is.

The reflection mirror surface is designed so that it is a convex surface relative to the image projection plane and the mirror has a uniform mirror thickness in order to improve moldability of the mirror and obtain mass production stability. Specifically, the mirror having a uniform thickness can be obtained by forming the back surface shape of the mirror surface, which is the reflection surface, so as to have substantially the same shape as the reflection surface. Further, a reflection mirror protrusion pin has been formed in a range of the back surface from which the free-form surface effective surface of the reflection mirror is removed, and this has made molding accuracy stabilize in the free-form surface effective surface of the reflection mirror caused at the time of mold release.

In addition, the surface roughness of the back surface has been made about 20 times coarser than the surface rougher of the lens effective area and made the roughness gradually small, and the back surface (the mold surface is a convex surface at the mirror molding time) has tightly adhered to the mold, so that the balance of the sticking between the reflection surface and the back surface at the time of mold release (in other words, the sticking of the molded article to the mold surface) has been achieved. As a result, in order to improve the sticking balance described above, a further improvement effect has been able to be obtained if the surface roughness of the back surface is less than 10 times of the surface roughness of the lens effective area, and a free-form surface mirror having excellent shape accuracy in a free-form surface effective area has been provided.

The designing method including the molding method of the above free-form surface mirror M13 as the plastic mirror has been able to safely take out the completed free-form surface mirror from the mold in the same manner as in the above free-form surface lenses L11 and L12. In addition, here, "141L" and "141R" in FIG. 5 respectively indicate protrusions for positioning and holding the lens when the free-form surface mirror M13 formed on both edges outside the free-form surface effective area is attached to the mirror base MB1. Similarly, "142L" and "142R" indicate concave portions provided in the projections. A reference numeral "144" denotes a protrusion formed at a lower end edge outside the above free-form surface effective area.

In addition, in the present embodiment, the free-form surface lenses L11 and L12 including the above-described free-form surface mirror M13 which is the plastic mirror are used as the free-form surface lens and/or the free-form surface mirror constituting the oblique projection optical system of the projection type image display device. According to the present embodiment, it is possible to mass-produce, at low cost, these lenses or mirrors from the resins and by the molds. Therefore, it is possible to obtain the free-form surface lens and the free-form surface mirror that contribute to cost reduction of the projection type image display device and also have excellent performance. This makes it possible to provide an excellent effect that can provide the projection type image display device inexpensive and also excellent in performance.

Although the embodiments of the present invention have been described above in detail, the present invention is not limited these embodiments, and various modifications are possible. For example, the above embodiment has been described about a detail of the whole devices for easy understanding of the present invention, and are not necessarily limited to those including all the above-described configurations. Regarding a part of the configuration of the embodiment, deletion, addition of other configurations, substitution to other configurations, and the like are possible.

REFERENCE SIGNS LIST

100 . . . projection type image display device; L11, L12 . . . free-form surface lens; L11-*a*, L12-*a* . . . lens effective area; L11-*b*, L12-*b* . . . lens end face part; L11-*c*, L12-*c* . . . gate part; L11-*p*, L12-*p* . . . flat surface; L11-*w*, L12-*w* . . . curved surface; L12-*d* . . . dam-shaped convex portion; M13 . . . free-form surface mirror; M13-*a* mirror effective area; and M13-*b* . . . end face part.

The invention claimed is:

1. A projection image display device magnifying and projecting image light modulated by an optical modulator modulating light from a light source, the projection image display device comprising:

an oblique projection optical system magnifying and projecting the modulated image light, wherein the oblique projection optical system comprises a plurality of lens elements, and a reflection mirror having a convex shape relative to an image projection plane, a center of an outer shape of one or the plurality of lens elements disposed at a nearest position to the reflection mirror is positioned above an optical axis shared by other lens elements, the reflection mirror has a reflection surface shape orthogonal to the image projection plane which includes the optical axis of the reflection mirror, the reflection surface shape being formed so that an average radius of curvature in an area through which a light flux focused on a center portion of the image projection plane passes is smaller than an average radius of curvature in an area through which a light flux focused on an upper end portion of the image projection plane passes, the lens element disposed at the nearest position to the reflection mirror is formed so that an average radius of curvature of a horizontal cross-section relative to the image projection plane in a lens surface facing the reflection mirror at an upper end portion of the lens element is greater than the average radius of curvature in the area through which the light flux focused on the center portion of the image projection plane on the same lens surface passes, one or a plurality of the lens elements different from the other lens elements in the center of the outer shape and disposed at the nearest position to the reflection mirror has a lens effective area, and a lens end face part provided in a part of an outer peripheral portion of the lens effective area, and is incorporated at a predetermined position in a second lens barrel by the lens end face part, the lens end face part has a first lens end face fixing the lens element to the second lens barrel, and a second lens end face that connects the lens effective area and the first lens end face by a flat surface or a curved surface, wherein the second lens end face is in the outer peripheral portion of the lens effective area that is provided with no lens end face part, and the second lens end face connects the lens effective area and the first lens end face such that an inclination direction of a surface of the lens effective area is unchanged, wherein in a side view, the first lens end face is positioned vertically, a first end of the first lens end face contacts a first end of the lens effective area, a second end of the lens effective area is positioned lower than a second end of the first lens end face, the second end of lens effective area being opposite the first end of the lens effective area and the second end of the first lens end face being opposite the first end of the first lens end face, the second lens end face extends from the second end of the lens effective area to the second end of the first lens end face, and the second lens end face is inclined between the second end of the lens effective area and the second end of the first lens end face.

2. The projection image display device according to claim 1, wherein at least the one or the plurality of lens elements and the reflection mirror are each made of a plastic material.

3. The projection image display device according to claim 1, wherein the lens element disposed at a nearest position to the reflection mirror among the other lens elements, and the one or the plurality of lens elements different from the other lens elements in the center of the outer shape and disposed at the nearest position to the reflection mirror are formed so as to be passed through by upper-limit light of the light flux focused on the upper end portion of the image projection plane and lower-limit light of the light flux focused on the center portion of the image projection plane without overlapping each other.

4. The projection image display device according to claim 1, wherein the other lens elements are incorporated in a first lens barrel, and the one or the plurality of lens elements different from the other lens elements in the center of the outer shape and disposed at the nearest position to the reflection mirror is incorporated in the second lens barrel separate from the first lens barrel.

5. The projection image display device according to claim 1, wherein the reflection mirror is formed so that surface roughness about its back surface becomes less than 20 times of surface roughness about the lens effective area of the lens element through which the light flux passes.

6. A projection image display device magnifying and projecting image light modulated by an optical modulator modulating light from a light source, the projection image display device comprising:

an oblique projection optical system magnifying and projecting the modulated image light, wherein the oblique projection optical system comprises a plurality of lens elements, and a reflection mirror having a convex shape relative to an image projection plane, a center of an outer shape of one or the plurality of lens elements disposed at a nearest position to the reflection mirror is positioned above an optical axis shared by other lens elements, the reflection mirror has a reflection surface shape orthogonal to the image projection plane which includes the optical axis of the reflection mirror, the reflection surface shape being formed so that an average radius of curvature in an area through which a light flux focused on a center portion of the image projection plane passes is smaller than an average radius of curvature in an area through which a light flux focused on an upper end portion of the image projection plane passes, the lens element disposed at the nearest position to the reflection mirror is formed so that an average radius of curvature of a horizontal cross-section relative to the image projection plane in a lens surface facing the reflection mirror at an upper end portion of the lens element is greater than the average radius of curvature in the area through which the light flux focused on the center portion of the image projection plane on the same lens surface passes, one or a plurality of the lens elements different from the other lens elements in the center of the outer shape and disposed at the nearest position to the reflection mirror has a lens effective area, and a lens end face part provided in a part of an outer peripheral portion of the lens effective area, and is incorporated at a predetermined position in a lens barrel by the lens end face part, the lens end face part includes
- a first lens end face fixing the lens element to the lens barrel, and
- a second lens end face that includes a curved surface and a connect surface, wherein the curved surface is in the outer peripheral portion of the lens effective area that is provided with no lens end face part, the curved surface being positioned such that an inclination direction of a surface of the lens effective area is unchanged, and the connect surface connects between the curved surface and the first lens end face, wherein in a side view, the first lens end face is positioned vertically, a first end of the first lens end face contacts a first end of the lens effective area, a second end of the lens effective area is positioned lower than a second end of the first lens end face, the second end of lens effective area being opposite the first end of the lens effective area and the second end of the first lens end face being opposite the first end of the first lens end face, the connect surface extends from the second end of the lens effective area to the second end of the first lens end face, and the connect surface is inclined between the second end of the lens effective area to the second end of the first lens end face.

* * * * *